United States Patent [19]
Fujita et al.

[11] Patent Number: 5,501,486
[45] Date of Patent: Mar. 26, 1996

[54] FAULT DETECTION METHOD AND APPARATUS FOR AIR BAG ACTIVATION DEVICE

[75] Inventors: Osamu Fujita; Katsuhiko Ohmae, both of Hyogo, Japan

[73] Assignee: Mitsubishi Denki Kabushiki Kaisha, Tokyo, Japan

[21] Appl. No.: 326,923

[22] Filed: Oct. 21, 1994

[30] Foreign Application Priority Data

Jun. 20, 1994 [JP] Japan ................... 6-137307

[51] Int. Cl.$^6$ ................... B60R 21/32
[52] U.S. Cl. ................... 280/735; 340/438; 307/10.1
[58] Field of Search ................... 280/735, 734; 340/438, 436; 307/10.1; 180/274, 282

[56] References Cited

U.S. PATENT DOCUMENTS

| | | | |
|---|---|---|---|
| 4,287,431 | 9/1981 | Yasui et al. | 280/735 |
| 4,825,148 | 4/1989 | McCurdy et al. | 280/735 |
| 4,956,631 | 9/1990 | Itoh | 280/735 |
| 5,081,442 | 1/1992 | Ito et al. | 280/734 |
| 5,135,254 | 8/1992 | Masegi et al. | 280/735 |
| 5,166,880 | 11/1992 | Furui | 280/735 |

FOREIGN PATENT DOCUMENTS

| | | | |
|---|---|---|---|
| 0057219 | 12/1986 | Japan . | |
| 5262202 | 10/1993 | Japan . | |
| 6024289 | 2/1994 | Japan | 280/735 |

*Primary Examiner*—Margaret A. Focarino
*Assistant Examiner*—Peter C. English
*Attorney, Agent, or Firm*—Sughrue, Mion, Zinn, Macpeak & Seas

[57] ABSTRACT

An air bag activation device for a vehicle air bag system eliminates the need to feed a small test current during the standby state so that the power consumption is minimized, and detects faults of the air bag activating device accurately even if the battery voltage fluctuates, and prevents the air bag from expanding erroneously. The device bases the fault detection on the calculation of the difference between an amplified voltage when a small constant current is fed to the air bag activating device from a constant current circuit, and an amplified voltage in the absence of the current.

12 Claims, 7 Drawing Sheets

FAULT DETECTION METHOD AND APPARATUS FOR AIR BAG ACTIVATION DEVICE

BACKGROUND OF THE INVENTION

1. Field of the Invention

The present invention relates to an air bag activation device which is capable of detecting faults that will cause the malfunctioning of the air bag system equipped on a vehicle, and to a method for such fault detection.

2. Description of the Prior Art

Figure 1:
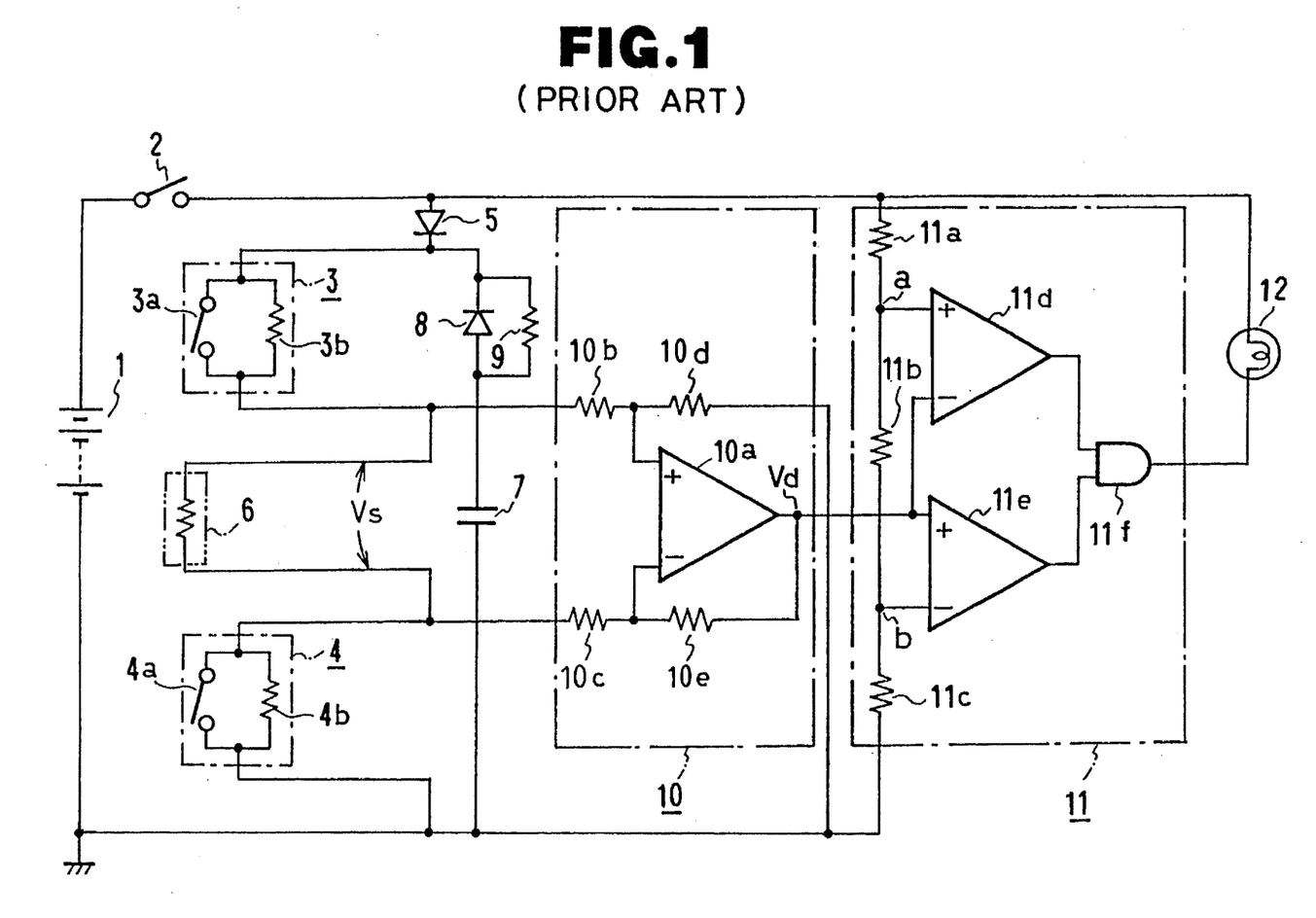
FIG. 1 is a schematic diagram showing a conventional air bag activation device.

FIG. 1 shows the circuit arrangement of the conventional air bag activation device disclosed in Japanese Patent Publication No. 61-57219 for example. In the figure, reference numeral 1 denotes a battery of an automobile on which the air bag system is equipped, 2 is an ignition switch, 3 and 4 are acceleration sensors which sense the collision of the vehicle, 3a and 4a are contacts that are closed in response to the detection of the collision of the vehicle, 3b and 4b are resistors through which a small current is supplied from the battery 1 to an air bag activating means 6 in the state when the contacts 3a and 4a of the acceleration sensors 3 and 4 are open, and 5 is a reverse current blocking diode. The air bag activating means 6, which is a detonator, for example, for igniting the explosive used to inflate the air bag (not shown), is supplied from the battery 1 with a triggering current that is large enough to trigger the expansion of the air bag when the contacts 3a and 4a become closed.

Indicated by 7 is a backup capacitor which is normally charged by the battery 1 and discharges power to the air bag activating means 6 if the battery 1 fails to work, 8 is a diode through which the backup capacitor 7 discharges, and 9 is a resistor through which the backup capacitor 7 is charged.

Indicated by 10 is a differential amplifier which amplifies a voltage Vs appearing between the terminals of the air bag activating means 6, 10a is an operational amplifier, 10b and 10c are gain setting resistors having the same resistance and 10d and 10e are gain setting resistors having the same resistance, all associated with the operational amplifier 10a, 11 is a window comparator which detects a fault of the air bag activating means 6 based on the output voltage Vd of the operational amplifier 10a, 11a, 11b and 11c are resistors for setting reference voltages Va and Vb for the window comparator 11, 11d and 11e are operational amplifiers each producing a fault detection signal if the difference of the output voltage Vd of the operational amplifier 10a from the reference voltage Va or Vb exceeds a prescribed value, and 11f is a logical AND gate which turns on an alarm lamp 12 when at least one of the operational amplifiers 11d and 11e produces the fault detection signal.

Next, the operation of the foregoing circuit arrangement will be explained. Initially, when the ignition switch 2 is turned on, a closed circuit is formed by the reverse current blocking diode 5, the resistor 3b in the acceleration sensor 3, the air bag activating means 6 and the resistor 4b in the acceleration sensor 4, and a small current having its value limited by the resistors 3b and 4b is fed to the air bag activating means 6. This state is called "standby state".

During the standby state, if the contacts 3a and 4a are closed in response to the detection of the collision of the vehicle by the acceleration sensors 3 and 4, a triggering current which is larger than the small current of the standby state is supplied from the battery 1 to the air bag activating means 6 and the air bag is inflated. This state is called "expansion state". The value of the triggering current is determined from the voltage of the battery 1 and the internal resistance R of the air bag activating means 6.

The voltage Vs appearing across the air bag activating means 6 when the ignition switch 2 is on (the voltage level is different between the standby state and expansion state) is applied to the differential amplifier 10. The differential amplifier 10 amplifies the voltage Vs based on its gain parameter (the reason for this amplification will be explained later) to produce an output voltage Vd.

The window comparator 11 compares the voltage Vd with the reference voltages Va and Vb so as to detect a fault of the air bag activating means 6. Specifically, if the air bag activating means 6 has a short-circuit, causing the differential amplifier 10a to produce a virtually zero voltage Vd, the operational amplifiers 11d and 11e compare the voltage Vd with the reference voltages Va and Vb to detect a difference in excess of the prescribed value, and a logical low-level signal (fault detection signal) indicative of the occurrence of short-circuit is produced. In response to a fault detection signal produced by at least one of the operational amplifiers 11d and 11e, the output of the AND gate 11f goes low (ground) to turn on the alarm lamp 12.

Finally, the reason for the amplification of the voltage Vs with the differential amplifier 10 will be explained briefly. The air bag activating means 6 has an internal resistance which is as low as several ohms and the voltage Vs across it is too small for accurate fault detection, and therefore the voltage Vs needs to be amplified. However, the operational amplifier 10a has a property of having an offset voltage Vofs at the input (it produces a small voltage difference even for zero-volt inputs), i.e., it amplifies the sum of Vs and Vofs to produce the output voltage Vd, and therefore a fault of the air bag activating means 6 cannot be detected accurately.

In order to alleviate the influence of the offset voltage, it is desirable to feed as large a standby current as possible to the air bag activating means 6, provided that it does not trigger the expansion of the air bag. In this case, however, if the battery 1 fails to supply power for some reason, the backup capacitor 7 is required to release a proportionally large current, resulting in an increased size of the capacitor 7 and thus the whole air bag activation device.

The conventional air bag activation device arranged as described above must supply a small current to the air bag activating means 6 for its fault detection during the standby state, resulting unfavorably in an increased power consumption of the device. Moreover, fault detection of the air bag activating means 6 is based on the amplified voltage Vd which represents the small voltage Vs, and a variation in the battery output voltage for some reason causes the voltage Vd to vary, resulting in a degraded accuracy of fault detection. In case the standby current increases significantly due to the fluctuation of the battery output voltage, it might even trigger the expansion of the air bag erroneously.

The differential amplifier 10a which amplifies the voltage Vs cannot avoid air offset voltage, and a fault of the air bag activating means 6 cannot be detected accurately. The occurrence of a short-circuit to the power source or a ground-fault of the air bag activating means 6 may not produce a significant change in the voltage Vs, and in this case these faults cannot be detected.

SUMMARY OF THE INVENTION

The present invention is intended to solve the foregoing prior art problems, and its prime object is to provide an air bag activation device which does not have to feed a small current to the air bag during the standby state so that the power consumption is minimized, which is capable of detecting a fault of the air bag activating means accurately even if the battery voltage varies for some reason, and which also prevents the erroneous expansion of the air bag.

Another object of this invention is to provide an air bag activation device which is capable of detecting a short-circuit to the power source of the air bag activating means accurately.

Still another object of this invention is to provide an air bag activation device which is capable of detecting a ground-fault of the air bag activating means accurately.

According to a first aspect of this invention, the air bag activation device is designed to calculate the difference between a voltage amplified by a voltage amplifying means when a small constant current is fed to the air bag activating means from a constant current supply means, and an amplified voltage in the absence of the small constant current, and detect a fault of the air bag activating means based on the result of calculation. Consequently, a fault of the air bag activating means can be detected accurately without being affected by the fluctuation of the battery output voltage.

According to a second aspect of this invention, the air bag activation device is designed to calculate the difference between a voltage of the air bag activating means on its ground side detected by a voltage detection means when a small constant current is fed to the air bag activating means from a constant current supply means and a detected voltage in the absence of the small constant current, and detect a short-circuit to the power source of the air bag activating means based on the result of calculation. In operation, the air bag activation device calculates the difference between the voltage of the air bag activating means on its ground side detected by the voltage detection means when the small constant current is fed to the air bag activating means and the detected voltage in the absence of the small constant current, and a short-circuit detection means detects a short-circuit to the power source of the air bag activating means based on the result of calculation. Consequently, a short-circuit to the power source of the air bag activating means can be detected accurately.

According to a third aspect of this invention, the air bag activation device is designed to calculate the difference between a voltage of the air bag activating means on its power source side detected by a voltage detection means when a small constant current is fed to the air bag activating means from a constant current supply means and a detected voltage in the absence of the small constant current, and detect a short-circuit to the power source of the air bag activating means based on the result of calculation. In operation, the air bag activation device calculates the difference between the voltage of the air bag activating means on its power source side detected by the voltage detection means when the small constant current is fed to the air bag activating means and the detected voltage in the absence of the small constant current, and a short-circuit detection means detects a short-circuit to the power source of the air bag activating means based on the result of calculation. Consequently, a short-circuit to the power source of the air bag activating means can be detected accurately.

According to a fourth aspect of this invention, the air bag activation device is designed to cause a voltage of a certain level to appear on the ground side of the air bag activating means when it is free from ground-fault, and detect a ground-fault of the air bag activating means based on the voltage level on the ground side of the air bag activating means. In operation, a voltage generation means of the air bag activation device causes a certain voltage level to appear on the ground side of the air bag activating means when it is free from ground-fault, and a ground-fault detection means detects a ground-fault of the air bag activating means based on the magnitude of the voltage on the ground side of the bag activating means. Consequently, a ground-fault of the air bag activating means can be detected accurately.

Preferably, the air bag activation device is designed to cut off the current supply to the air bag activating means except the cases when the collision sensing means has sensed the collision of vehicle and when the constant current supply means feeds a small constant current to the air bag activating means. In operation, the control means of the air bag activation device cuts off the current supply to the air bag activating means except when the collision sensing means has sensed the collision of vehicle and when the constant current supply means supplies the small constant current. Consequently, the erroneous expansion of the air bag can surely be prevented.

DETAILED DESCRIPTION OF THE PREFERRED EMBODIMENTS

Figure 2:
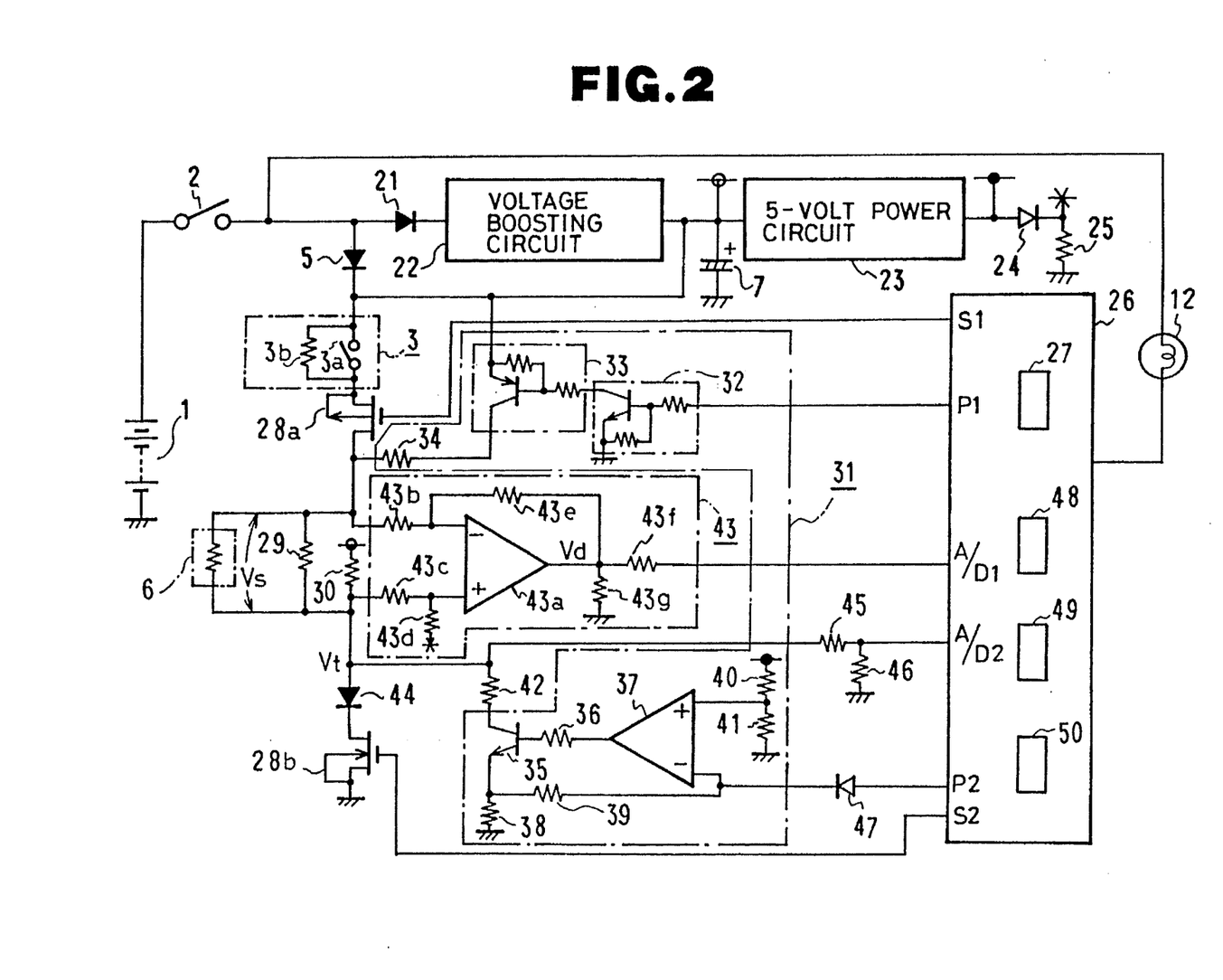
FIG. 2 is a schematic diagram showing an air bag activation device based on an embodiment of this invention.

FIG. 2 shows the circuit arrangement of the air bag activation device based on an embodiment of this invention. In the figure, components equal or equivalent to those of the conventional device shown in FIG. 1 are referred to by the same reference numerals, and the explanation thereof will not be repeated.

In FIG. 2, reference numeral 21 denotes a reverse current blocking diode, 22 is a voltage boosting circuit which raises the output voltage of the battery 1 to charge a backup capacitor 7, 23 is a power supply circuit which produces a 5-volt power for a microcomputer 26, and 24 is a diode which produces a power voltage of about 4.3 volts in cooperation with a resistor 25. The microcomputer 26 includes a control means 27 which turns on FETs 28a and 28b in response to the reception of a signal from an electronic acceleration sensor (not shown) indicative of the detection of the collision of the vehicle so that a triggering current is fed to the air bag activating means 6 from the battery 1.

The FET 28a is connected to the air bag activating means 6 on its power source side and is turned on by the control signal from port S1 of the microcomputer 26, and the FET 28b is connected to the air bag activating means 6 on its ground side and is turned on by the control signal from port S2 of the microcomputer 26. A resistor 29 is connected in parallel to the air bag activating means 6, and another resistor 30 is connected on the ground side of the activating means 6 and is supplied with a current from the voltage boosting circuit 22.

Indicated by 31 is a constant current circuit which provides the air bag activating means 6 for its fault detection with a current i that is small enough not to expand the air bag and constant even if the battery output voltage varies, 32 is a transistor which is turned on by the control signal from port P1 of the microcomputer 26, 33 is a transistor which turns on in response to the conduction of the transistor 32, 34 is a resistor, 35 is a transistor, 36 is a resistor, 37 is an operational amplifier, and 38 through 42 are resistors.

Indicated by 43 is a differential amplifying circuit for amplifying the voltage appearing across the air bag activating means 6, and it consists of an operational amplifier 43a and resistors 43b, 43c, 43d, 43e, 43f and 43g. The resistors 43b and 43c have the same resistance and the resistors 43d and 43e have the same resistance. A diode 44 is connected on the ground side of the air bag activating means 6 to produce a voltage of a certain level when it is free from a ground-fault, 45 and 46 are resistors for detecting the voltage of the air bag activating means 6 on its ground side and 47 is a diode.

Indicated by 48 is a fault detection means which calculates the difference between a voltage amplified by the differential amplifying circuit 43 when the small constant current i is fed to the air bag activating means 6 from the constant current circuit 31, and an amplified voltage in the absence of the current i, and detects a fault of the air bag activating means 6 based on the result of calculation. A short-circuit detection means 49 calculates the difference between a voltage of the air bag activating means 6 on its ground side when the small constant current i is fed to the air bag activating means 6 from the constant current circuit 31, and a voltage in the absence of the current i, and detects a short-circuit to the power source of the activating means 6 based on the result of calculation. A ground-fault detection means 50 detects a ground-fault of the air bag activating means 6 based on the magnitude of the voltage of the air bag activating means 6 on its ground side.

Next, the operation of the foregoing circuit arrangement will be explained. Initially, the air bag inflating operation by the air bag activating means 6 will be explained. When the ignition switch 2 is turned on, the system enters the standby state in which the air bag can be inflated in response to the result of detection of the acceleration sensor 3.

The air bag activation device based on this first embodiment is different from the conventional one shown in FIG. 1 in that the microcomputer 26 holds the FETs 28a and 28b in a cutoff state unless the electronic acceleration sensor (not shown) senses the collision of the vehicle, and therefore no current is fed to the air bag activating means 6 in the standby state and the power consumption can be minimized.

During the standby state, if the acceleration sensor 3 and the electronic acceleration sensor (not shown) sense a vehicle collision, the microcomputer 26 turns on the FETs 28a and 28b to feed the triggering current to the air bag activating means 6 from the battery 1, and the air bag is inflated. The backup capacitor 7 is kept charged by the voltage boosting circuit 22 to a voltage higher than the battery voltage during the standby state, and it can maintain the power supply for a certain length of time for the expansion of air bag in case the battery 1 fails to supply power for some reason.

Figure 3:
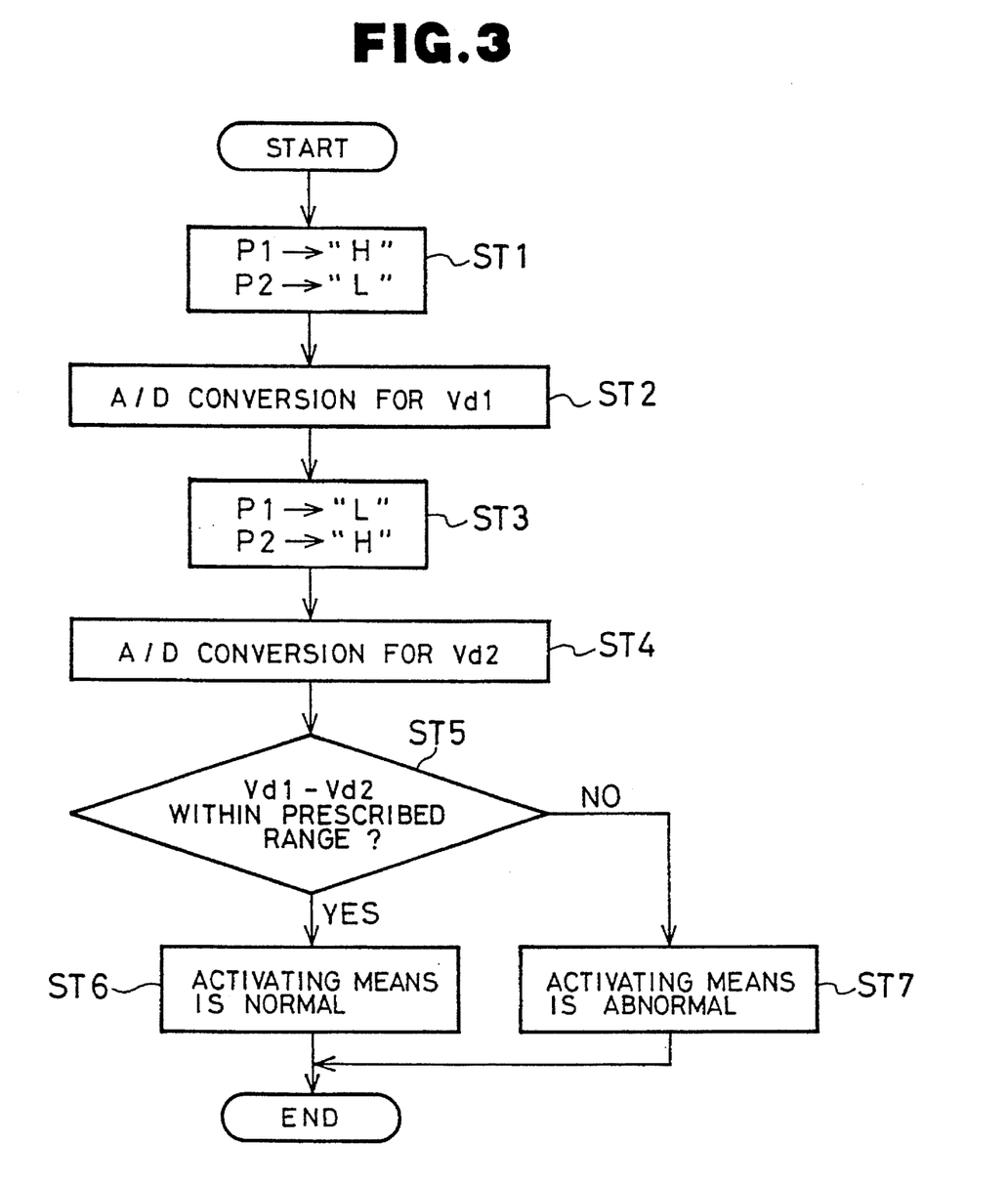
FIG. 3 is a flowchart showing the process of detecting a fault of the air bag activating means.

Next, the operation of detecting a fault of the air bag activating means 6 (i.e., a short circuit or an open circuit) will be explained with reference to the flowchart of FIG. 3. The principle of fault detection of this embodiment is based on the magnitude of a voltage appearing across the air bag activating means 6.

In step ST1, the microcomputer 26 sends a logical high-level control signal through its port P1 to the transistor 32 thereby to turn on the transistors 32 and 33 so that a current supply from the voltage boosting circuit 22 to the air bag activating means 6 is ready. At the same time, the microcomputer 26 releases a low-level control signal through its port P2 thereby to commence the operation of the constant current circuit 31, by which a small constant current i having a value determined by the operational amplifier 37 and resistors 38, 40 and 41, and stabilized against the fluctuation of the battery voltage with the intention of accurate fault detection, is supplied from the voltage boosting circuit 22 to the air bag activating means 6.

The small constant current i causes the air bag activating means 6 to produce a voltage Vs across it, and the differential amplifying circuit 43 having a gain of G amplifies the voltage Vs to produce Vd1. The microcomputer 26 receives the voltage Vd1 through its port A/D1, converts the voltage into digital data and stores the data: (step ST2).

Next, the microcomputer 26 sends a low-level control signal through its port P1 to the transistor 32 and a high-level control signal through its port P2 to the constant current circuit 31 so as to eliminate the offset voltage Vofs included in Vs with the intention of accurate fault detection for the air bag activating means 6: (step ST3). The transistors 32 and 33 are thus turned off to disconnect the voltage boosting circuit 22 from the air bag activating means 6 and the constant current circuit 31 is deactivated, and consequently the supply of small constant current i to the air bag activating means 6 is cut off.

The differential amplifying circuit 43 receives a zero input voltage Vs (no difference between the voltages on the inverting and noninverting input terminals). However, due to the input offset voltage Vofs of the operational amplifier 43a, the differential amplifying circuit 43 produces an output voltage Vd2 that is the result of amplification of Vofs by the gain G. The microcomputer 26 receives the voltage Vd2 through its port A/D1, converts the voltage into digital data and stores the data: (step ST4).

Receiving both amplifier output voltages Vd1 and Vd2, the microcomputer 26 subtracts Vd2 from Vd1 to eliminate the offset voltage component, to thereby obtain an accurate voltage Vd that represents the voltage Vs across the air bag activating means 6, as follows.

$$\Delta AD = Vd1 - Vd2 \quad (1)$$
$$= (i \times R + Vofs) \times G - Vofs \times G$$
$$= i \times R \times G$$

where Vd1 is the output voltage of the differential amplifying circuit 43 when the small constant current i is fed to the air bag activating means 6, Vd2 is the output voltage in the absence of the current i, R is the resistance of the air bag activating means 6, Vofs is the offset voltage of the differential amplifying circuit 43, and G is the gain of the differential amplifying circuit 43.

The microcomputer 26 tests whether or not the difference $\Delta AD$ (i.e., Vd1–Vd2) is within a prescribed allowable range that is determined from the value of the small constant current i, the resistance of the air bag activating means 6, and the gain G of the differential amplifying circuit 43: (step ST5). The air bag activating means 6 is judged to be normal if the difference ΔAD is within the prescribed range: (step ST6), or otherwise it is judged to be abnormal: (step ST7), in which case the microcomputer 26 turns on the alarm lamp 12 to notify the vehicle driver that the air bag system is faulty.

Although in this embodiment the voltage Vd1 is measured first and the voltage Vd2 next, the order of voltage measurement may be reversed and the same performance is achieved.

Figure 4:
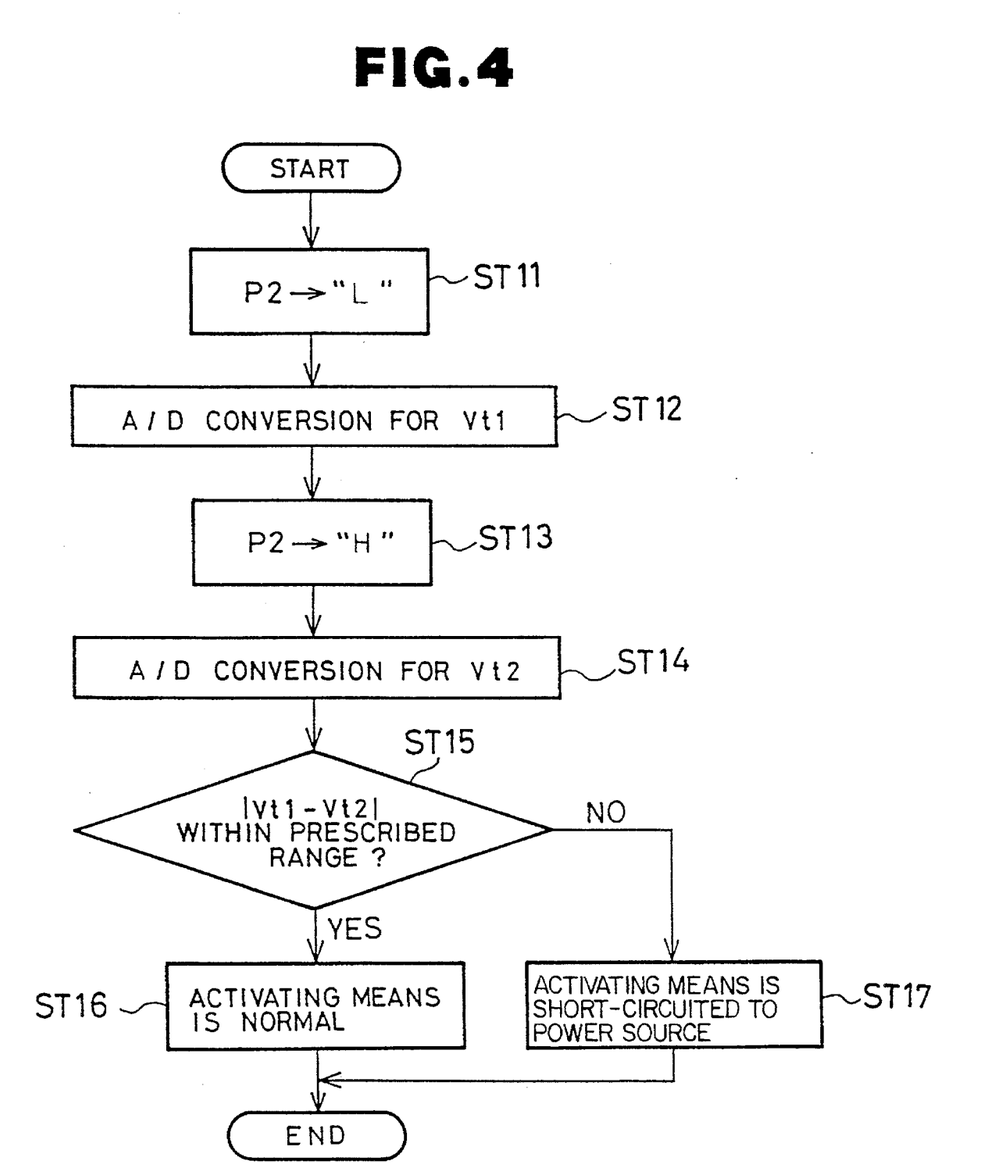
FIG. 4 is a flowchart showing the process of detecting a short-circuit to the power source of the air bag activating means.

Next, the operation of detecting a short-circuit to the power source of the air bag activating means 6 will be explained with reference to the flowchart of FIG. 4.

The microcomputer 26 releases a low-level control signal through its port P2 to activate only the operational amplifier 37: (step ST11). It receives through its port A/D2 a voltage Vt1 appearing on the ground side of the air bag activating means 6, converts the voltage Vt1 into digital data and stores the data: (step ST12). Next, the microcomputer 26 releases a high-level control signal through the port P2 to deactivate the constant current circuit 31: (step ST13). It receives through its port A/D2 a voltage Vt2 appearing on the ground side of the air bag activating means 6, converts the voltage Vt2 into digital data and stores the data: (step ST14).

Receiving both voltages Vt1 and Vt2, the microcomputer 26 calculates the difference between Vt1 and Vt2. It tests whether or not the difference is within a prescribed allowable range: (step ST15). The air bag activating means 6 is judged to be free from a short-circuit to either terminal of the power source if the difference is within the prescribed range: (step ST16), or otherwise it is judged to be short-circuited toward the power source and the microcomputer 26 turns on the alarm lamp 12 to notify the vehicle driver that the air bag system has a short-circuit to the power source: (step ST17).

The principle of detection of short-circuit to the power source based on the foregoing judgement process is as follows. When the air bag activating means 6 is free from short-circuit to the power source, the voltage Vt1 is determined from the resistance of resistor 30 and the small constant current i, and the voltage Vt2 is determined from the resistances of resistors 30, 45 and 46. Accordingly, Vt1 and Vt2 differ greatly. On the other hand, if the air bag activating means 6 is short-circuited toward the power source, both voltages Vt1 and Vt2 are virtually equal to the battery terminal voltage. Accordingly, the short-circuit to the power source of the air bag activating means 6 can be detected by evaluating the difference between the voltages Vt1 and Vt2.

Although in this embodiment the voltage Vt1 is measured first and the voltage Vt2 next, the order of voltage measurement may be reversed and the same performance is achieved.

Figure 5:
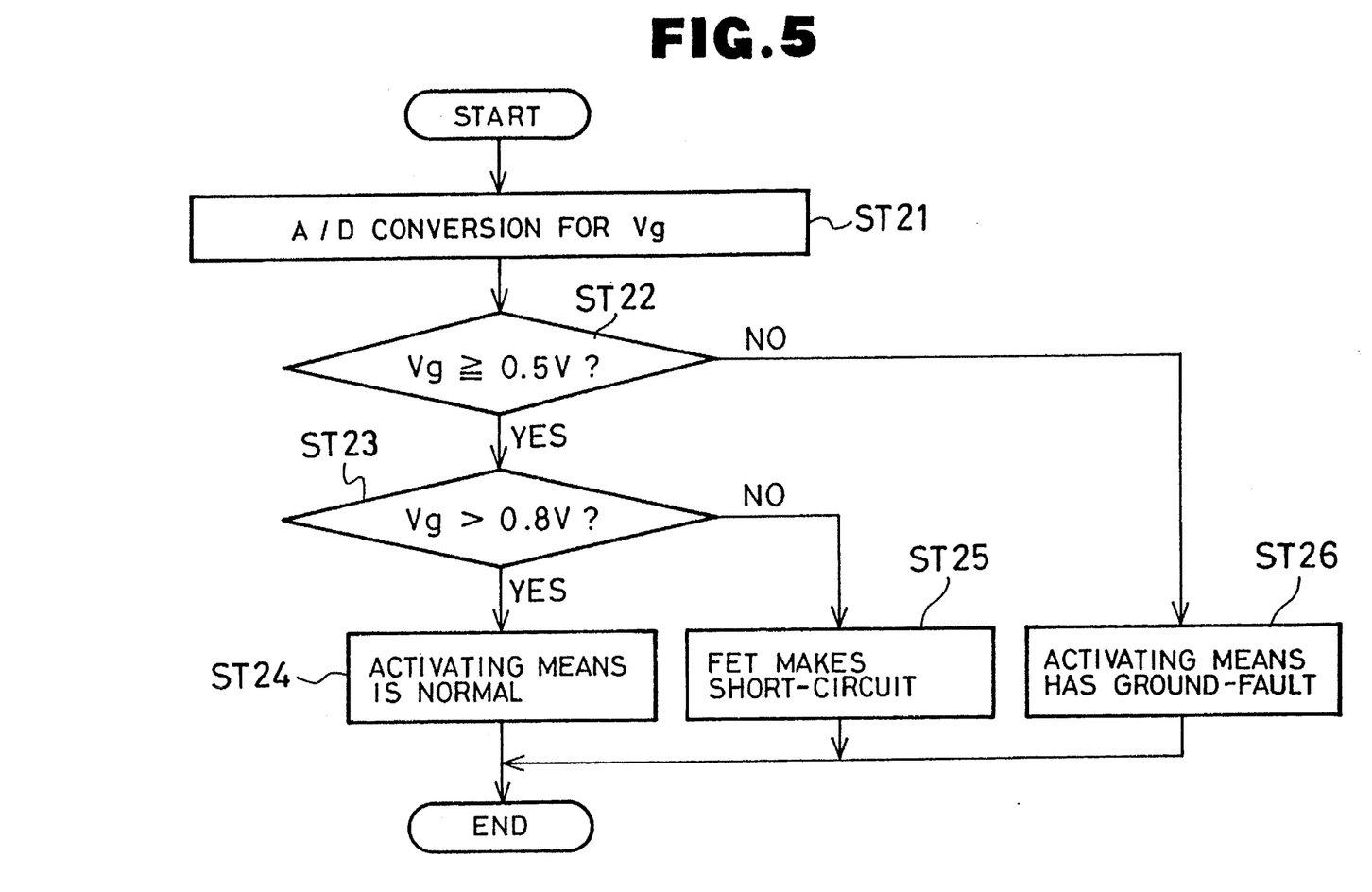
FIG. 5 is a flowchart showing the process of detecting a ground-fault of the air bag activating means.

Next, the operation of detecting a ground-fault of the air bag activating means 6 will be explained with reference to the flowchart of FIG. 5. Ground-fault detection is based on the magnitude of the voltage Vg appearing on the ground side of the air bag activating means 6.

The microcomputer 26 receives through its port A/D2 a voltage Vg appearing on the ground side of the air bag activating means 6 and converts the voltage Vg into digital data: (step ST21). In case the air bag activating means 6 is free from a ground-fault, the voltage Vg is determined from the resistances of resistors 30, 45 and 46; Vg is pulled to a virtually zero ground voltage if there is ground-fault. Accordingly, a ground-fault of the air bag activating means 6 can be detected by measuring the voltage Vg.

Although the voltage Vg will also fall if the FET 28b breaks to make a short-circuit, it retains about 0.5 to 0.8 volt due to the voltage drop across the diode 44 located on the ground side of the air bag activating means 6, and accordingly it is possible for the microcomputer 26 to distinguish a ground-fault of the activating means 6 from a short-circuit of FET 28b based on the magnitude of the voltage Vg: (step ST22–ST26). Specifically, the air bag activating means 6 is judged to be normal if the voltage Vg is higher than 0.8 volt: (step ST24), or the FET 28b is judged to be broken if the voltage Vg is lower than 0.8 volt and higher than 0.5 volt: (step ST25), or the air bag activating means 6 is judged to have a ground-fault if the voltage Vg is lower than 0.5 volt: (step ST26). In response to the judgement of a ground-fault of the air bag activating means 6 or a short circuit of the FET 28b, the microcomputer 26 turns on the alarm lamp 12 to notify the vehicle driver that the air bag system has a ground-fault.

The foregoing embodiment does not have to supply a small current to the air bag activating means 6 during the standby state, which is needed in the conventional system, whereby the power consumption in the standby state can be minimized. Even if the battery output voltage varies for some reason, a stabilized small current is fed to the air bag activating means 6, and a fault of the activating means 6 can be detected accurately. Since no current is fed to the air bag activating means 6 during the standby state, the erroneous expansion of the air bag can surely be prevented. Since the differential amplifying circuit 43 has its output voltage subtracted by the offset voltage component, the accuracy of fault detection is enhanced. A short-circuit to the power source a ground-fault of the air bag activating means 6 can be detected reliably without the provision of a dedicated short-circuit detecting circuit and/or a ground-fault detecting circuit.

Figure 6:
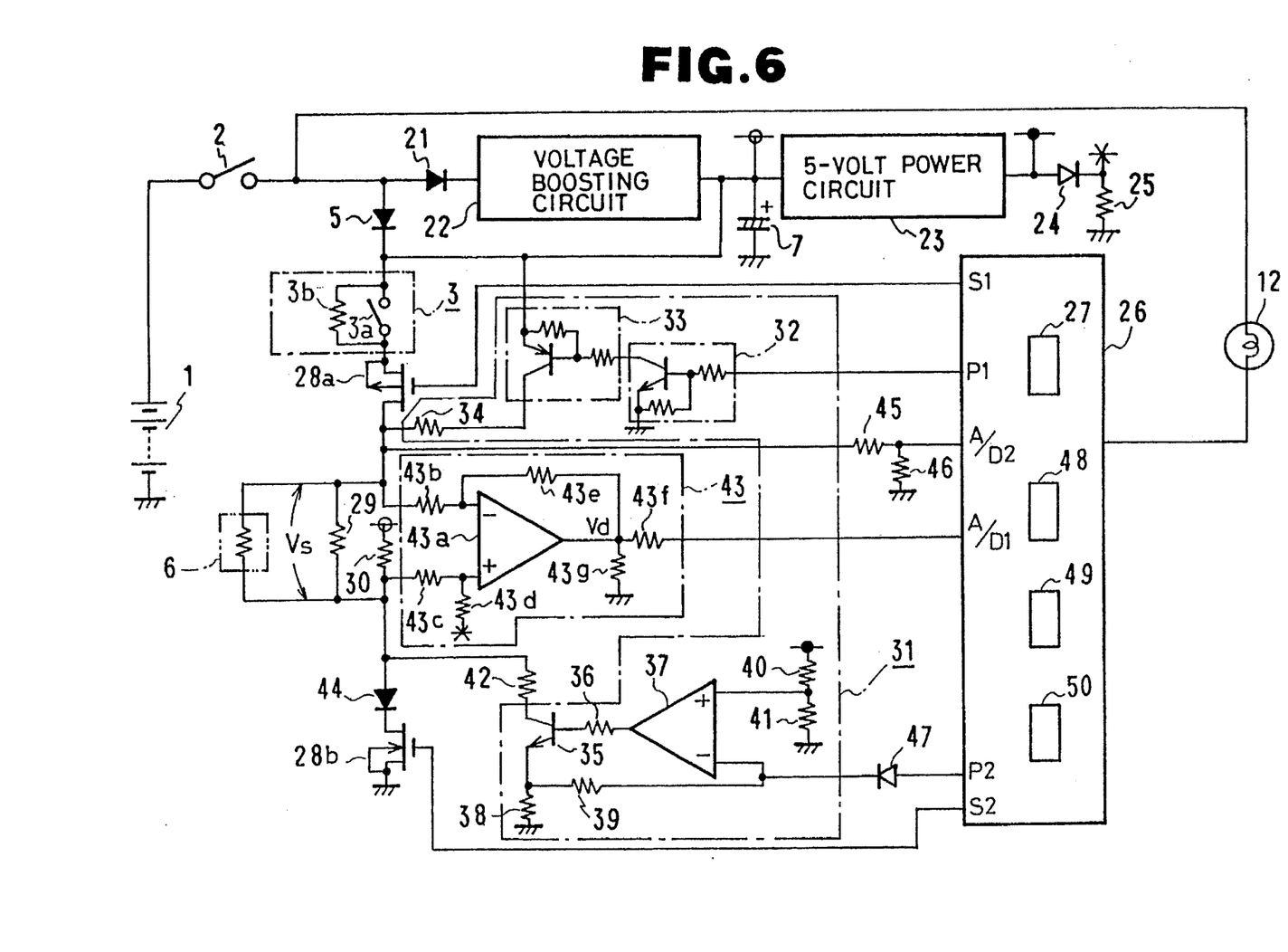
FIG. 6 is a schematic diagram showing an air bag activation device based on a variant embodiment of this invention.

Although in this embodiment a voltage appearing on the ground side of the air bag activating means 6 is introduced to the port A/D2 of microcomputer 26, a voltage appearing on its power source side may be used and treated in the same manner as shown in FIG. 6 for detecting a short-circuit to the power source or a ground-fault of the air bag activating means 6.

Figure 7:
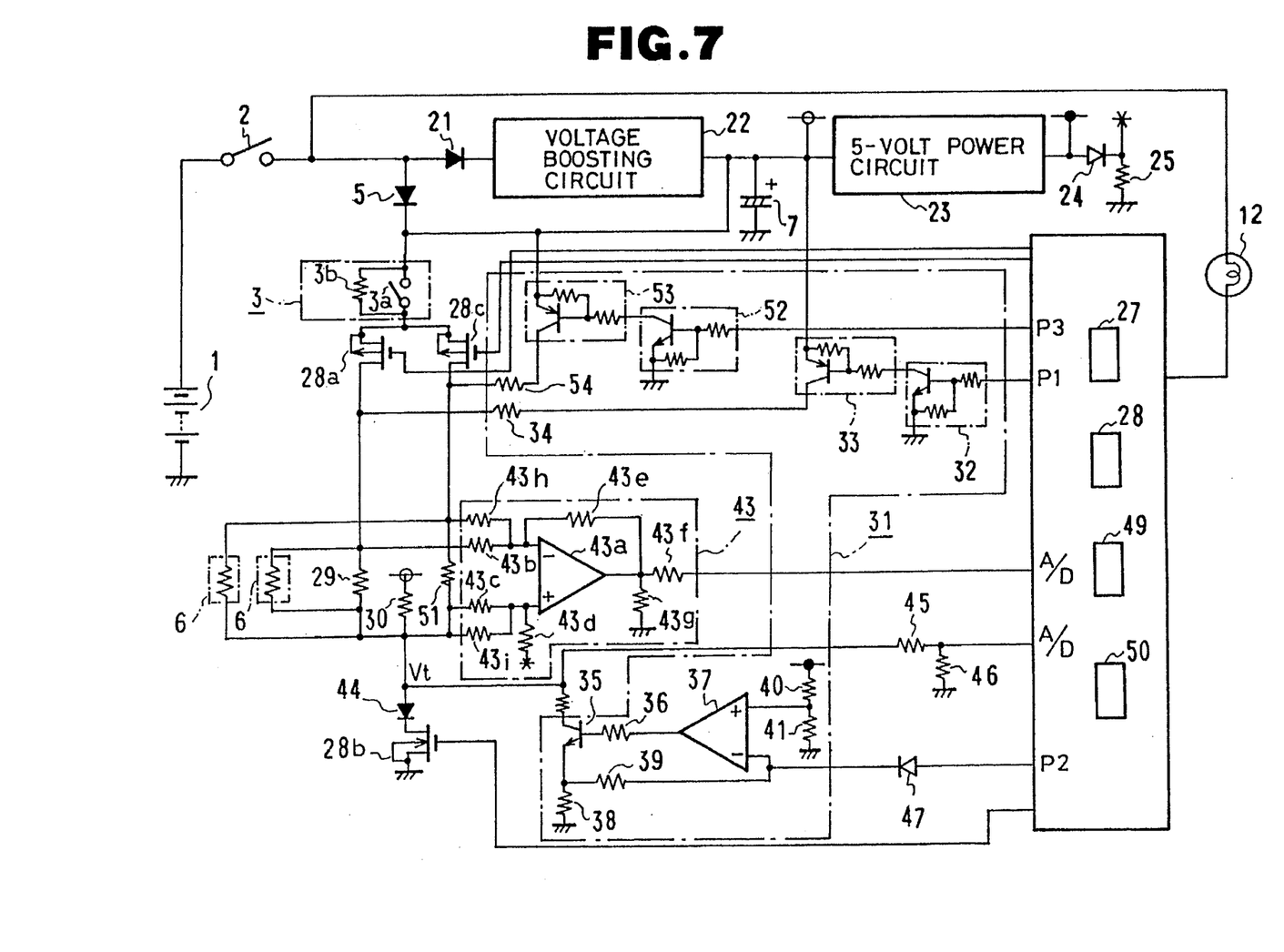
FIG. 7 is a schematic diagram showing an air bag activation device based on another embodiment of this invention.

Although the air bag activation device of these embodiments include only one air bag activating means 6, it may have two air bag activating means 6 as shown in FIG. 7 for air bags provided for both the driver's seat and front passenger's seat of a vehicle. In this case, the second air bag activating means 6 is connected to the differential amplifying circuit 43 through additional resistors 43h and 43i in parallel to the first air bag activating means 6, with transistors 52 and 53 and resistors 51 and 54 being added for the second means 6, and a fault, short-circuit to the power source and ground-fault of both air bag activating means 6 can be detected in the same manner as is the first embodiment.

Although the foregoing embodiments use the microcomputer 26 to compare voltages in detecting a fault, short-circuit to the power source and ground-fault of the air bag activating means 6, a window comparator or the like may be used to compare the voltages, and the same performance is achieved.

What is claimed is:

1. A fault detection circuit for an air bag activation device having collision sensing means for sensing a collision of a vehicle on which said device is installed, air bag activating means for inflating an air bag in response to a triggering current, and control means for feeding the triggering current to said air bag activating means in response to a signal indicative of the detection of a collision of the vehicle from said collision sensing means, said fault detection circuit comprising:

a) current supply means for non-continuously supplying a small, constant magnitude current, of insufficient strength to trigger the air bag activating means, to said air bag activating means to detect a fault thereof, even if a triggering current supply voltage source varies;

b) voltage amplifying means for amplifying a voltage appearing across said air bag activating means; and c) fault detection means for detecting a fault of said air bag activating means based on an output of the voltage amplifying means when said small, constant magnitude current is supplied to said air bag activating means.

2. A fault detection circuit according to claim 1, wherein the fault detection means includes voltage detection means for detecting a voltage appearing on a ground side of said air bag activating means; and short circuit detection means which calculates the difference between a voltage detected by said voltage detection means when the small, constant magnitude current is supplied to said air bag activating means from said current supply means and a voltage detected in the absence of the small, constant magnitude current, and detects a short circuit to a power source of said air bag activating means based on the result of the calculation.

3. A fault detection circuit according to claim 1, wherein the fault detection means includes voltage detection means for detecting a voltage appearing on a power source side of said air bag activating means; and short circuit detection means which calculates the difference between a voltage detected by said voltage detection means when the small, constant magnitude current is supplied to said air bag activating means from said current supply means and a voltage detected in the absence of the small, constant magnitude current, and detects a short circuit to the power source of said air bag activating means based on the result of the calculation.

4. A fault detection circuit according to claim 1, further including voltage generation means connected on the ground side of said air bag activating means for causing a voltage to appear on the ground side of said air bag activating means; voltage detection means for detecting a voltage appearing on the ground side of said air bag activating means; and ground-fault detection means for detecting a ground-fault of said air bag activating means based on the magnitude of the voltage detected by said voltage detection means.

5. A fault detection circuit according to claim 4, wherein said voltage generation means comprises a diode.

6. A fault detection circuit according to claim 1, wherein the fault detection means calculates a difference between the output of said voltage amplifying means when the small, constant magnitude current is supplied to said air bag activating means and the output of said voltage amplifying means when the small, constant magnitude current is not fed to said air bag activating means, and detects a fault of said air bag activating means based on the result of the calculation.

7. A fault detection circuit according to claim 1, further comprising:

a) switch means connected to one end of said air bag activating means for varying a voltage appearing on a terminal thereof; and b) voltage detection means for detecting a voltage appearing on said terminal of the air bag activating means;

c) wherein said fault detection means judges an occurrence of a fault in said air bag activating means if a difference between a voltage detected when said switching means are on and a voltage detected when said switching means are off does not lie within a predetermined range.

8. A fault detection circuit according to claim 1, further comprising:

a) voltage supply means for supplying a voltage to one terminal of said air bag activating means; and b) voltage detection means for detecting a voltage appearing on said one terminal of said air bag activating means;

c) wherein said fault detection means judges an occurrence of a short-circuit to ground in said air bag activating means if a voltage detected by said voltage detection means is a predetermined value or less.

9. A fault detection circuit according to claim 8, further comprising:

a) a one-way conduction element connected to said one terminal of said air bag activating means; and b) switch means connected between said one-way conduction element and ground for closing in response to a collision of said vehicle;

c) wherein said fault detection means judges an occurrence of a short-circuit to ground in said air bag activating means if a voltage detected by said voltage detection means is less than a first predetermined value, and judges an occurrence of a fault in said switch means if said detected voltage is equal to or greater than said first predetermined value but less than a second predetermined value.

10. A fault detection circuit according to claim 1, further comprising:

a) trigger current supply means, b) voltage boosting means for boosting a voltage supplied to the trigger current supply means; and c) energy storage means connected to an output of said voltage boosting means for storing energy received therefrom, and for supplying said stored energy as a substitute for said trigger current supply means when a fault has occurred in said trigger current supply means.

11. A method for detecting a fault in an air bag activation device which inflates a vehicle air bag by supplying a triggering current to an air bag activating means, comprising the steps of:

a) discontinuously supplying a small, constant magnitude current of insufficient strength to trigger the air bag activating means, to said air bag activating means, even if a triggering current supply voltage source varies;

b) amplifying a voltage appearing across said air bag activating means; and c) detecting a fault of said air bag activating means based on said amplified voltage when said small, constant magnitude current is supplied to said air bag activating means.

12. A method for detecting a fault in an air bag activation device according to claim 11, wherein said fault detecting step comprises the steps of:

a) detecting said amplified voltage when said small, constant magnitude current is supplied to said air bag activating means;

b) detecting said amplified voltage when said small, constant magnitude current is not supplied to said air bag activating means;

c) calculating a difference between the amplified voltage when the small, constant magnitude current is supplied to said air bag activating means and the amplified voltage when the small, constant magnitude current is not supplied to said air bag activating means; and d) detecting a fault of said air bag activating means based on said difference.

\* \* \* \* \*